United States Patent
Kennedy et al.

(10) Patent No.: US 8,584,225 B1
(45) Date of Patent: Nov. 12, 2013

(54) PUSH CHANNEL AUTHENTICATION FOR MOBILE COMPUTING DEVICES

(71) Applicant: Live Nation Entertainment, Inc., Beverly Hills, CA (US)

(72) Inventors: Bain Kennedy, Thousand Oaks, CA (US); Kenneth Ives-Halperin, Encino, CA (US); James Yang, Hacienda Heights, CA (US); Harry Evans, Los Angeles, CA (US); Michael David Abrams, Los Angeles, CA (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 0 days.

(21) Appl. No.: 13/725,780

(22) Filed: Dec. 21, 2012

(51) Int. Cl.
*H04L 29/06* (2006.01)

(52) U.S. Cl.
USPC .......................................................... 726/10

(58) Field of Classification Search
USPC .......................................................... 726/10
See application file for complete search history.

(56) References Cited

U.S. PATENT DOCUMENTS

| | | | |
|---|---|---|---|
| 7,647,269 B2 | 1/2010 | Brett | |
| 7,698,210 B2 | 4/2010 | Brett | |
| 7,720,746 B2 | 5/2010 | Brett | |
| 7,747,507 B2 | 6/2010 | Brett | |
| 7,769,673 B2 | 8/2010 | Brett | |
| 8,073,765 B2 | 12/2011 | Brett | |
| 8,126,991 B2 | 2/2012 | Smith et al. | |
| 8,266,211 B2 | 9/2012 | Smith et al. | |
| 8,294,549 B2 | 10/2012 | Samovar et al. | |
| 2007/0276944 A1 | 11/2007 | Samovar et al. | |
| 2010/0217629 A1 | 8/2010 | Brett | |
| 2010/0257002 A1 | 10/2010 | Brett | |
| 2012/0124138 A1 | 5/2012 | Smith et al. | |
| 2012/0330697 A1 | 12/2012 | Smith et al. | |

OTHER PUBLICATIONS

Author Unknown, "Local and Push Notification Programming Guide," Developer, Aug. 9, 2011, 56 pages, Apple Inc., California, USA. Retrieved from: http://developer.apple.com/library/ios/#documentation/NetworkingInternet/Conceptual/RemoteNotifications PG/Introduction/Introduction.html#//apple_ref/doc/uid/TP40008194-CH1-SW1.

*Primary Examiner* — Jacob Lipman
(74) *Attorney, Agent, or Firm* — Kilpatrick Townsend & Stockton LLP

(57) ABSTRACT

Methods and systems for push channel authentication for mobile computing devices are provided. A mobile application may be supplied, and an indication that the application has been loaded on the mobile computing device may be processed. A device identifier received from the mobile computing device through a network may be processed, and corresponding information may be stored in an authentication information repository. An authentication key and an authentication token may be generated and sent separately to the mobile computing device through a push channel and through a second channel. That the mobile application has received the authentication key and the authentication token may be verified. A notification that the mobile application has received the authentication key and the authentication token may be processed. The notification may be validated at least in part with the information corresponding to the device identifier in the authentication information repository.

20 Claims, 9 Drawing Sheets

PUSH CHANNEL AUTHENTICATION FOR MOBILE COMPUTING DEVICES

BACKGROUND OF THE DISCLOSURE

The present disclosure relates in general to security and, more specifically, but not by way of limitation, to push channel authentication for mobile computing devices.

With the continued proliferation of applications and services using the Internet, malicious activity focused on exploiting such applications and services also continues. One example of such activity involves the use of computer programs such as robots or bots. Bots can displace typical human interaction with applications and services by performing automated tasks over the Internet, particularly tasks involving repetition, at a higher rate than humanly possible.

Bots can be injected into various aspects of e-commerce and beyond, with various negative ramifications. One example is in the marketplace for tickets sales in the entertainment industry. A bot may be employed by a broker to purchase a large number of tickets for an event as soon as the tickets are made available for sale to the general public. In that way, the bot may be supplant the general public, allowing the broker in turn to offer the tickets for sale at increased prices, which only redounds to the benefit of the broker and places the general public at a disadvantage. Other examples of where bots can exploit e-commerce may include online auctions and marketplaces where high-demand products are released, such as new, popular electronics, toys, etc.

To combat bots, various anti-bot techniques have revolved around the use of CAPTCHA (Completely Automated Public Turing Test to tell Computers and Humans Apart). CAPTCHA is widely used as a means for testing whether requests received by websites are from humans. A typical example of CAPTCHA is a webpage that displays irregular/distorted characters that are not easily recognized by a bot, but which may be recognized by a human. Consequent to recognition of the characters, the human user can enter the characters into a text field and submit the entered characters for a determination of whether the entered characters match the displayed irregular/distorted characters. A match may typically indicate that the user is human.

While CAPTCHAs may be effective as bot deterrents, CAPTCHAs can have drawbacks. As bots become more sophisticated, characters used with CAPTCHAs tend to become more irregular/distorted in order to handle the bots. As the CAPTCHAs become more difficult for bots to read, they likewise become more difficult for humans to read. Moreover, even the more readily recognizable CAPTCHAs can be difficult to read on mobile computing devices that may have smaller displays relative to other computer devices such that the CAPTCHA is harder to see. Such difficulties can cause annoyance to the user, especially if the user must make multiple attempts to pass the test. Even the added step of the CAPTCHA itself, with the effort and time required to pass the test, can be a negative experience for the user, who may not want to devote the time and attention to the test.

SUMMARY

The present disclosure relates in general to security and, more specifically, but not by way of limitation, to push channel authentication for mobile computing devices.

Certain embodiments may provide for authentication based on push services. With certain embodiments, a mobile application may be made available for execution on a mobile computing device. Certain embodiments may assist in authenticating websites, other services on the Internet, desktop, and/or enterprise applications so that users are not required to type anything to effect authentication. In some embodiments, a user may select an option to receive push transmissions to the user's mobile computing device. Certain embodiments may provide a multi-channel authentication regime to lock down communications between the application of a mobile computing device and a mobile application service provider. Various methods of uniquely identifying the mobile computing device may be employed, with certain embodiments conjoining multiple methods to synergistically enhance the level of authentication. Multiple unique device identifiers may be identified for a given mobile computing device. One or more of the multiple unique device identifiers may be a basis for key and/or authentication token generation. Certain embodiments provide for secure key and/or authentication token delivery via multiple, distinct channels, including one or more push channels. The authentication may be peer-to-peer in some embodiments. The application of the mobile computing device can only interface with the mobile application service provider system using that key and authentication token. An application not having the key and authentication token cannot communicate with the mobile application service provider.

Numerous benefits can be achieved by way of embodiments according to the present invention over conventional techniques. For example, certain embodiments may provide all the security of CAPTCHA without requiring users to endure a CAPTCHA process. Accordingly, certain embodiments may eliminate the need for undesirable CAPTCHA processes. Certain embodiments may provide for frictionless authentication that runs in the background, from the user perspective. Certain embodiments may deter or block bot activity that may otherwise exploit transactions for a mobile computing device. Certain embodiments may provide immune from scripts that could be written to spoof application code through regular computers to appear as the application to a server-side component. These and other embodiments along with many of its additional advantages and features are described in more detail in conjunction with the text below and attached figures.

In one aspect, a method for push channel authentication for mobile computing devices may be provided. A mobile application configured to run on a mobile computing device may be supplied. An indication that the mobile application has been loaded on the mobile computing device may be processed. A device identifier for the mobile computing device may be processed, the device identifier received from the mobile computing device through a network. Information corresponding to the device identifier may be stored in an authentication information repository. An authentication key and an authentication token may be generated. The authentication token may be caused to be sent to the mobile computing device through a push channel. The authentication key may be caused to be sent to the mobile computing device through a second channel. That the mobile application has received the authentication key and the authentication token may be verified. The verifying may include processing a notification from the mobile computing device that the mobile application has received the authentication key and the authentication token. The verifying may include validating the notification at least in part with the information corresponding to the device identifier in the authentication information repository.

In another aspect, one or more non-transitory computer-readable storage media having computer-readable instructions for push channel authentication for mobile computing devices, the instructions to cause one or more processors to perform a method, are provided. An indication that a mobile application configured to run on a mobile computing device has been loaded on the mobile computing device may be processed. A device identifier for the mobile computing device may be processed, the device identifier received from the mobile computing device through a network. Information corresponding to the device identifier may be stored in an authentication information repository. An authentication key and an authentication token may be generated. The authentication token may be caused to be sent to the mobile computing device through a push channel. The authentication key may be caused to be sent to the mobile computing device through a second channel. That the mobile application has received the authentication key and the authentication token may be verified. The verifying may include processing a notification from the mobile computing device that the mobile application has received the authentication key and the authentication token. The verifying may include validating the notification at least in part with the information corresponding to the device identifier in the authentication information repository.

In yet another aspect, a system for push channel authentication for mobile computing devices may be provided. The system may include one or more network interfaces configured to provide access to the Internet, and an authentication information repository. The system may include one or more processors, coupled to the one or more network interfaces and to the authentication information repository, the one or more processors to execute instructions to: process an indication that a mobile application configured to run on a mobile computing device has been loaded on the mobile computing device; process a device identifier for the mobile computing device, the device identifier received from the mobile computing device through a network; store information corresponding to the device identifier in the authentication information repository; generate an authentication key and an authentication token; cause the authentication token to be sent to the mobile computing device through a push channel; cause the authentication key to be sent to the mobile computing device through a second channel; and verify that the mobile application has received the authentication key and the authentication token. The verifying may include processing a notification from the mobile computing device that the mobile application has received the authentication key and the authentication token. The verifying may include validating the notification at least in part with the information corresponding to the device identifier in the authentication information repository. The system may include one or more storage media coupled to the one or more processors to retain the instructions.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
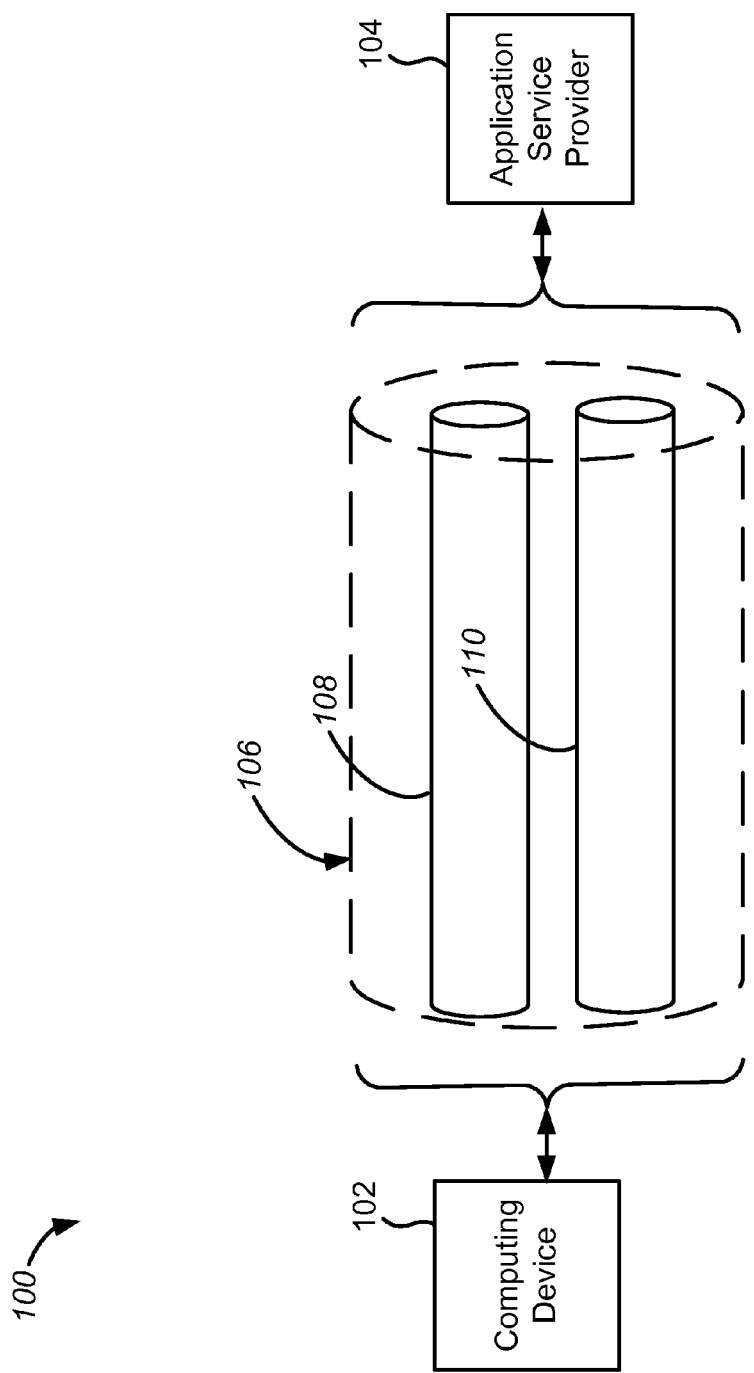
FIG. 1 depicts a high-level block diagram of a system for push channel authentication, in accordance with certain embodiments of the present disclosure.

In the appended figures, similar components and/or features may have the same reference label. In the specification, the description is applicable to any one of the similar components having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Certain embodiments according to the present disclosure may provide all the security of CAPTCHA without requiring users to endure a CAPTCHA process. From the user standpoint, the provision of authentication according to certain embodiments may be frictionless such that authentication runs in the background without requiring time and attention from the user each time authentication is needed. Certain embodiments may provide for authentication based on push services. Certain embodiments may deter or block bot activity that may otherwise exploit transactions for a mobile computing device. With certain embodiments, a mobile application may be made available for execution on a mobile computing device. Various embodiments may include a specific purpose-based mobile application or a mobile application integrated with various other mobile application features. Certain embodiments may assist in authenticating websites, other services on the Internet, desktop, and/or enterprise applications so that users are not required to type anything to effect authentication.

Certain embodiments according to the present disclosure may provide end-to-end immunity from a single point of security compromise. Certain embodiments may be immune from scripts that could be written to spoof application code through regular computers to appear as the application to a server-side component. In some embodiments, a user may select an option to receive push transmissions to the user's mobile computing device. This may be done with a one-time process at installation of the application. This may be done at any of various times after installation of the application via a user-selectable option. In some embodiments, a mobile computing device can be authorized for use by a particular user. In various embodiments, push channel authentication may be implemented with websites, desktop applications, mobile applications, and/or enterprise applications. With some embodiments, any existing website may be configured to use this form of authentication.

Certain embodiments may provide a multi-channel authentication regime to lock down communications between the application of a mobile computing device and a mobile application service provider. Various methods of uniquely identifying the mobile computing device may be employed, with certain embodiments conjoining multiple methods to synergistically enhance the level of authentication. Multiple unique device identifiers may be identified for a given mobile computing device. One or more of the multiple unique device identifiers may be a basis for registering the mobile computing device with the mobile application service provider system. One or more of the multiple unique device identifiers may be a basis for key and/or authentication token generation. Certain embodiments provide for secure key delivery. The key and the authentication token may be sent securely to the application via multiple, distinct channels. The authentication may be peer-to-peer in some embodiments, eliminating the threat of a bottleneck or a single point of failure. A user of the mobile computing device can only interface with the mobile application service provider system using that key and authentication token. An application not having the key and authentication token cannot communicate with the mobile application service provider.

Various embodiments will now be discussed in greater detail with reference to the accompanying figures, beginning with FIG. 1.

FIG. 1 depicts a high-level block diagram of a system 100 for push channel authentication, in accordance with certain embodiments of the present disclosure. The system 100 may be configured for authentication of one or more computing devices 102. The system may include one or more of a computing device 102, an application service provider 108, a multi-channel composite 106, a communication channel 108, and a communication channel 110.

The computing device 102 may include an application ("app") that operates on the computing device 102. In some embodiments, the application service provider 108 may make the app available for download to the computing device 102. In some embodiments, the app may be made available for download to the computing device 102 via an online distribution facility, such as an app store. In various embodiments, the app may be any software module, native or non-native, for operating on the computing device 102 and that can benefit from authentication features described herein. In some embodiments, the application service provider 108 may provide the app to the online app store or other online distribution facility, which in turn may provide the app to the computing device 102. In other embodiments, another entity may provide the app to the online app store or other online distribution facility.

In various embodiments, the computing device 102 and/or the application service provider 108 may each include any device or set of devices configured to compute, process, organize, categorize, qualify, send, receive, retrieve, generate, encode, decode, encrypt, decrypt, convey, store, present, detect, handle, and/or use any form of information and/or data suitable to facilitate embodiments described herein. The application service provider 108 could include a single computing device, a server, for example, or multiple computing devices, which may be implemented in or with a distributed computing and/or cloud computing environment with a plurality of servers and cloud-implemented resources.

Certain embodiments may provide a multi-channel authentication regime to lock down communications between the application of the computing device 102 and the application service provider 104. The multi-channel composite 106, communication channel 108, and communication channel 110 may effectively constitute multiple communication pipes within a communication pipe according to certain embodiments. Some embodiments may implement a greater number of communication channels. One or more of the channel composite 106, communication channel 108, and/or communication channel 110 may be secure channels established for authentication. In various embodiments, one or more of the channels could be one or more of point-to-point, peer-to-peer, SSL (Secure Sockets Layer), and/or TSL (Transport Layer Security) connections. One or more of the channels may be authenticated, encrypted, and/or persistent in certain embodiments.

Accordingly, in some embodiments, one or both of the communication channel 108 and communication channel 110 may be secure channels that provide for a pipe-in-pipe-in-pipe scheme. Communications between the application service provider and the computing device via the communication channel 108, the communication channel 110, and/or outside both channels 108, 110, via the communication pipe of the channel composite 106. In some embodiments, one or both of the communication channel 108 and communication channel 110 may be allow for push channels for communication of push transmissions from the application service provider 104 to the computing device 102. Thus, dual push channels may be employed for authentication in some embodiments. In some embodiments, push channels may be established within the communication channel 108 and/or communication channel 110 to provide for a pipe-in-pipe-in-pipe scheme. In some embodiments, the multi-channel authentication regime may be established at least in part with multi-layer authentication that is described in further detail herein. In certain embodiments, multiple push channel authentication may be achieved via multiple secure channels.

Figure 2:
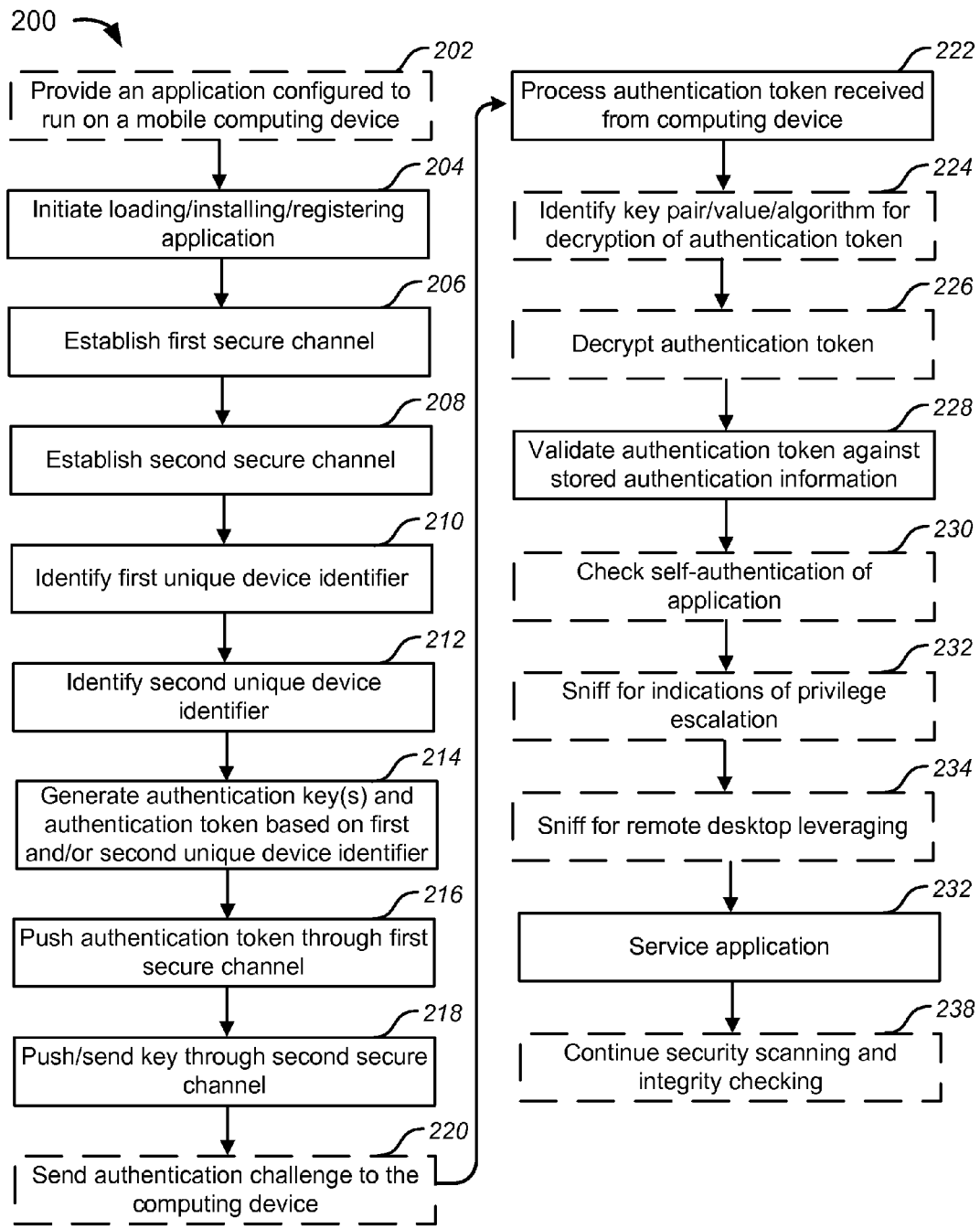
FIG. 2 illustrates a flowchart for a simplified method of push channel authentication, in accordance with certain embodiments of the present disclosure.

FIG. 2 illustrates a flowchart 200 for a simplified method of push channel authentication, in accordance with certain embodiments of the present disclosure. According to one embodiment, the method 200 may begin at step 202. Teachings of the present disclosure may be implemented in a variety of configurations that may correspond to the system 100 and/or other systems described herein. As such, the order of the steps comprising the method 200 may be shuffled in any suitable manner and may depend on the implementation chosen. Moreover, while the following steps may be separated for the sake of description, it should be understood that certain steps may be performed simultaneously or substantially simultaneously.

In some embodiments, the method may include providing an application configured to run on a mobile computing device, as indicated by block 202. This may include making the application available for download from an Internet-accessible location. This may include sending, from the mobile computing device, a request to a resource through a network, and downloading the application from the Internet-accessible location. Certain embodiments may be applicable to other types of computing devices. Accordingly, in certain embodiments, an application may be provided for another type of computing device that is not a mobile computing device, such as a desktop computer. In certain embodiments, the application may be native or non-native to the computing device.

Loading, installing, and/or registering the application may be initiated, as indicated by block 204. The installation process may be initiated as part of the loading of the application in certain embodiments. The installation process may be initiated responsive to a user input in certain embodiments. Likewise, in various embodiments, the process of registering the application with the application service provider may be initiated as part of the loading and/or installation of the application, and/or responsive to a user input. The application service provider may receive a service request from the computing device and/or a call for authentication of the computing device. The call may include an indication corresponding to the initiation of the loading, installing, and/or registering, and, responsive to that indication, the application service provider may initiate further steps for authentication of the computing device.

Details corresponding to the following steps are described further herein. A first secure channel and second secure channel may be established for authentication of the computing device, as indicated by blocks 206 and 208, respectively. The application service provider may initiate the secure connections for the first secure channel and/or second secure channel in some embodiments. In alternative embodiments, only one of the first and second channels may be secure. A first unique device identifier and a second unique device identifier for the computing device may be identified, as indicated by blocks 201 and 212, respectively. The first and second unique device identifiers may be sent to the application service provider. The application service provider may generate one or more keys and one or more authentication tokens for authentication of the computing device, as indicated by block 214. In some embodiments, the key and/or token generation may be based at least in part on the first unique device identifier and/or the second unique device identifier. In some embodiments, the token may be an encrypted derivative of the first unique device identifier and/or the second unique device identifier. The first unique device identifier and/or the second unique device identifier could be retrievable from token with any suitable cryptographic method in certain embodiments. In some embodiments, the key(s) may be a derivative of the first unique device identifier and/or the second unique device identifier in conjunction with a cryptographic algorithm.

In some embodiments, the authentication token may be pushed to the computing device through a push channel of the first secure channel, as indicated by block 216. However, in alternative embodiments, the key may be pushed to the computing device through a push channel of the first secure channel. In some embodiments, the key may be pushed or otherwise sent to the computing device through the second secure channel, as indicated by block 218. However, in alternative embodiments, the authentication token may be pushed or otherwise sent to the computing device through the second secure channel. In embodiments where only one of the two channels is secure, one of the key and the authentication token may be sent to the computing device via the secure channel, and one may be sent via the other channel.

In some embodiments, an authentication challenge may be sent to the computing device, as indicated by block 220. The authentication challenge may require a response that can only be provided if the computing device possesses both the key and the authentication token. In some embodiments, the application of the computing device may decrypt the authentication token with the key and send a corresponding response for validation to the application service provider. In some embodiments, the computing device may send the decrypted token. In some embodiments, the computing device may send the token again encrypted with a suitable cryptographic method. In some embodiments, the computing device may send another suitable response based at least in part on the key and the authentication token.

In some embodiments, the application service provider may process the authentication token received from the computing device, as indicated by block 222. In other embodiments, the application service provider may process other information sent from the computing device for validation. In some embodiments, where the computing device sent an encrypted value for the validation, a cryptographic key pair/value/algorithm may need to be identified, as indicated by block 224, so the encrypted value may be decrypted, as indicated by block 226. The information sent from the computing device, whether it be the authentication token or otherwise, may be validated against stored authentication information, as indicated by block 228.

In certain embodiments, the application may be configured to perform a self-authentication. The results of self-authentication may be indicated to the application service provider, as indicated by block 230. In some embodiments, the application service provider may sniff for indications of privilege escalation, such as a jailbreak situation, as indicated by block 232. Assuming that no weak link is identified in any of the components of the authentication tower, the application service provider may service the application normally, as indicated by block 232. In certain embodiments, security scanning and integrity checking may continue on any suitable basis, periodic, continual, random, or otherwise, as indicated by block 238.

In certain embodiments, the authentication process or part of the process may be repeated for each transaction or set of transactions involving the application of the computing device. In certain embodiments, the passing of new authentication tokens and keys may be repeated for each transaction or set of transactions involving the application of the computing device. In certain embodiments, the authentication token or another token derived therefrom may be passed for each subsequent transaction or set of transactions involving the application of the computing device.

Figure 3:
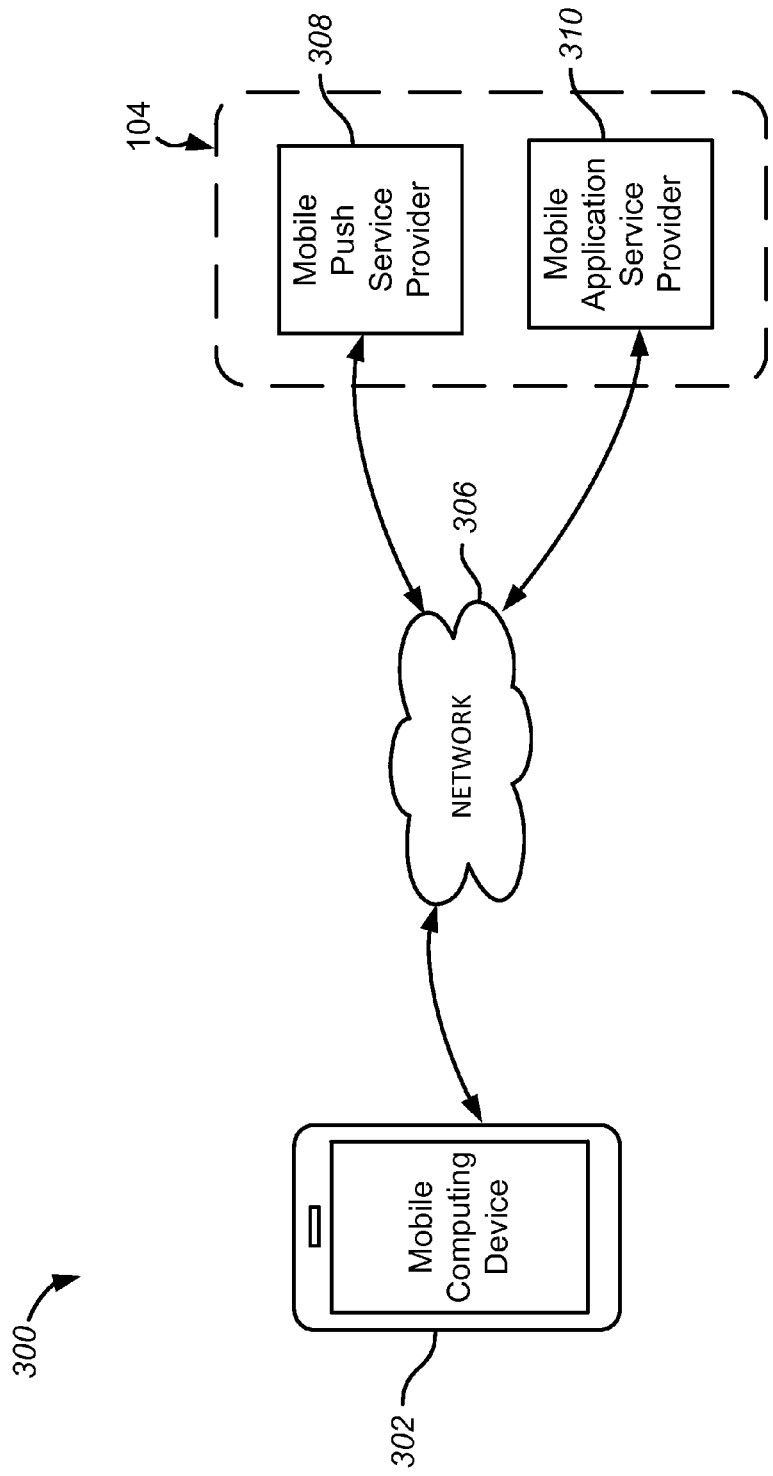
FIG. 3 depicts a high-level block diagram of a system for push channel authentication, in accordance with certain embodiments of the present disclosure.

FIG. 3 depicts a high-level block diagram of a system 300 for push channel authentication, in accordance with certain embodiments of the present disclosure. The system 300 may correspond to certain embodiments of the system 100. The system 300 may be configured for authentication of one or more computing devices, which may correspond to one or more mobile computing devices 302. The system 300 may include one or more of a mobile computing device 302, a network 306, and/or the application service provider 104.

The mobile computing device 302 may be any portable user device suitable for sending and receiving information over a network in accordance with embodiments described herein. For example without limitation, in various embodiments, the mobile computing device 302 may include one or more variously referenced as a mobile phone, a cellular telephone, a smartphone, a handheld mobile device, a tablet computer, a web pad, a personal digital assistant (PDA), a notebook computer, a handheld computer, a laptop computer, or the like. In some embodiments, the mobile computing device 302 may include one or more mobile applications configured to run on the mobile computing device 302.

According to some embodiments, the application service provider 104 may include a mobile push service provider 308 and a mobile application service provider 310. In some embodiments, the mobile push service provider 308 and the mobile application service provider 310 may be integrated such that the same entity provides for the features of both components. In other embodiments, the mobile push service provider 308 and the mobile application service provider 310 may be separate such that the features of each are provided by different entities.

In various embodiments, the mobile push service provider 308 and/or the mobile application service provider 310 may each include any device or set of devices configured to compute, process, organize, categorize, qualify, send, receive, retrieve, generate, encode, decode, encrypt, decrypt, convey, store, present, detect, handle, and/or use any form of information and/or data suitable to facilitate embodiments described herein. The mobile push service provider 308 and/or the mobile application service provider 310 could each include a single computing device, a server, for example, or multiple computing devices, which may be implemented in or with a distributed computing and/or cloud computing environment with a plurality of servers and cloud-implemented resources. Thus, the mobile push service provider 308 and/or the mobile application service provider 310 may each include one or more servers. The mobile push service provider 308 and/or the mobile application service provider 310 may each include one or more processing resources communicatively coupled to one or more storage media, random access memory (RAM), read-only memory (ROM), and/or other types of memory. The mobile push service provider 308 and/or the mobile application service provider 310 may each include any one or combination of various input and output (I/O) devices and network ports.

As depicted, the mobile computing device 302, the mobile push service provider 308, and the mobile application service provider 310 may be communicatively coupled or couplable to a network 306. In some embodiments, the multi-channel composite 106 may be established at least in part with the network 306. The network 306 may be any suitable means to facilitate data transfer in the system 100. In various embodiments, the network 306 may be implemented with, without limitation, one or more of the Internet, a wide area network (WAN), a local area network (LAN), a wireless local area network (WLAN), a metropolitan area network (MAN), a cellular network, such as through 4G, 3G, GSM, etc., another wireless network, a gateway, or any other appropriate architecture or system that facilitates the communication of signals, data, and/or message. The network 306 may transmit data using any suitable communication protocol. The network 306 and its various components may be implemented using hardware, software, and communications media such as wires, optical fibers, microwaves, radio waves, and/or other electromagnetic and/or optical carriers; and/or any combination of the foregoing.

The mobile computing device 302 may include an app that operates on the mobile computing device 302. In some embodiments, the mobile push service provider 308 and/or the mobile application service provider 310 may make the app available for download. In some embodiments, the app may be made available for download to the mobile computing device 302 via an online distribution facility, such as an app store. In some embodiments, the app may be any software module, native or non-native, for operating on the mobile computing device 302 and that can benefit from authentication features described herein. In some embodiments, the mobile push service provider 308 and/or the mobile application service provider 310 may provide the app to the online app store or other online distribution facility, which in turn may provide the app to the mobile computing device 302. In other embodiments, another entity may provide the app to the online app store or other online distribution facility.

Figure 4:
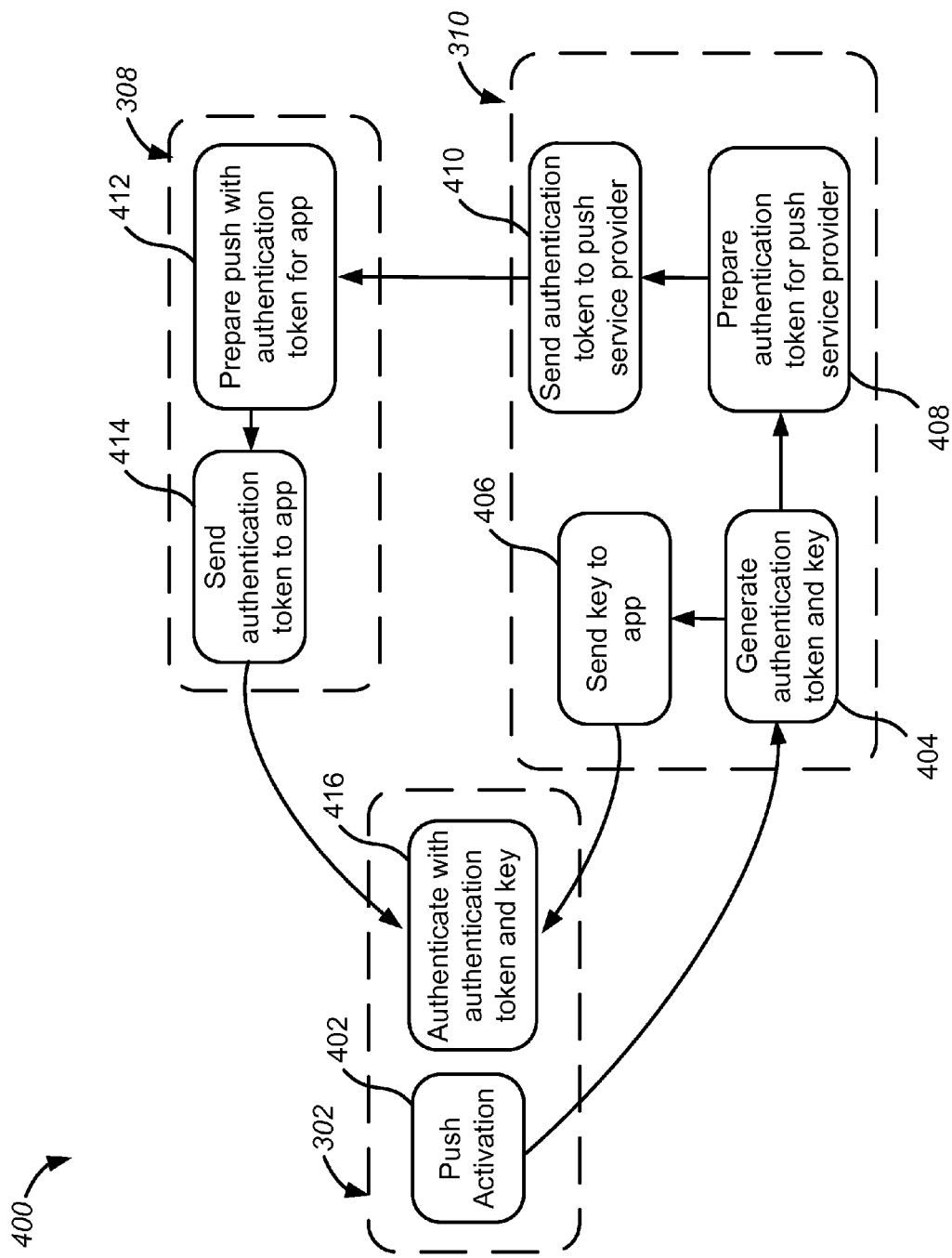
FIG. 4 depicts a simplified functional diagram of push channel authentication, in accordance with certain embodiments of the present disclosure.

FIG. 4 illustrates a simplified functional diagram of push channel authentication 400, in accordance with certain embodiments of the present disclosure. If an application is not pre-loaded on the mobile computing device 302, it may be downloaded to the mobile computing device 302 in some embodiments. With the application loaded, the mobile computing device 302 may receive an activation 402 of an option to receive push transmissions.

One or more keys and/or one or more authentication tokens may be generated or selected, as indicated by block 404. In some embodiments, the authentication token and the key can be required for authentication. The authentication token and the key can be sent to the mobile computing device 302 via separate channels. In some embodiments, the mobile application service provider 310 may have one or more keys and/or be configured to generate one or more keys for authentication of the mobile computing device 302. The one or more keys may include any suitable cryptographic key, and various embodiments, for example, may employ one or more of symmetrical, private key, asymmetrical, and/or public key, encryption. The one or more keys could be deterministically derived from a master key when needed. The one or more keys could be used to generate the one or more unique authentication tokens.

The key generation may be based in part on a unique device identifier for the mobile computing device 302 in some embodiments. In some embodiments, a unique device identifier may correspond to the MAC (Media Access Control) address of a wireless card of the mobile computing device 302. In other embodiments, a unique device identifier may include any suitable identifier, such as the unique device identifier commonly referenced as Device ID (DEVID), a new identifier generated by the application based on any reliable unique identification information, universally unique identifier, globally unique identifier, etc. In some embodiments, a unique device identifier may be derived from a combination of the MAC address and another unique device identifier.

The key may be sent to the application, as indicated by block 406. A secure channel may be established for the key transmission. In various embodiments, the channel could be one or more of a point-to-point, peer-to-peer, SSL (Secure Sockets Layer), and/or TSL (Transport Layer Security) connection. In some embodiments, the key may be pushed to the application. In other embodiments, the key may be sent responsive to a request from the application, for example, after the application receives the authentication token as discussed below. According to various embodiments, the secure channel could correspond to one or more of the channel composite 106, communication channel 108, and/or communication channel 110.

The authentication token may be prepared for push alert services, as indicated by block 408. In some embodiments, the mobile application service provider 310 may prepare the authentication token and then, as indicated by block 410, provide the authentication token to the mobile push service provider 308 for a push transmission to the mobile computing device 302. In some embodiments, the communications between the mobile application service provider 310 and the mobile push service provider 308 may also be via any suitably secure connection consistent with the other secure connections used.

As indicated by block 412, a push transmission may be prepared for the target mobile computing device 302, the transmission to include the authentication token. As indicated by block 414, the authentication token may be sent to the application through the push channel. The push channel constitutes a secure connection and may, in various embodiments, be one or more of a point-to-point, peer-to-peer, SSL, and/or TSL connection. According to various embodiments, the secure channel could correspond to one or more of the channel composite 106, communication channel 108, and/or communication channel 110.

Having obtained the authentication token and the key via the multiple channels, authentication may be effected, as indicated by block 416. The application may be configured to authenticate the mobile computing device 302 with the mobile application service provider 310 in any suitable manner. For example, the application may pass the decrypted token back to the mobile application service provider 310 for validation prior to further communications with the mobile application service provider 310. The token could again be cryptographically obscured for the transfer to the mobile application service provider 310 in some embodiments. In some embodiments, the application could pass any suitable alternative authentication information derived with the key and the authentication token. For example, the authentication token and the key may be a basis for further encryption/decryption of information communicated to/from the mobile application service provider 310. Accordingly, in certain embodiments, multiple push channel authentication may be achieved via multiple secure channels. One or more of the channels may be authenticated, encrypted, and/or persistent in certain embodiments.

In alternative embodiments, the conveyance of the key and authentication token could be reversed. The mobile application service provider 310 may provide the authentication token directly to the mobile computing device 302. And the mobile push service provider 308 may push the key to the mobile computing device 302 via a push channel.

Figure 5:
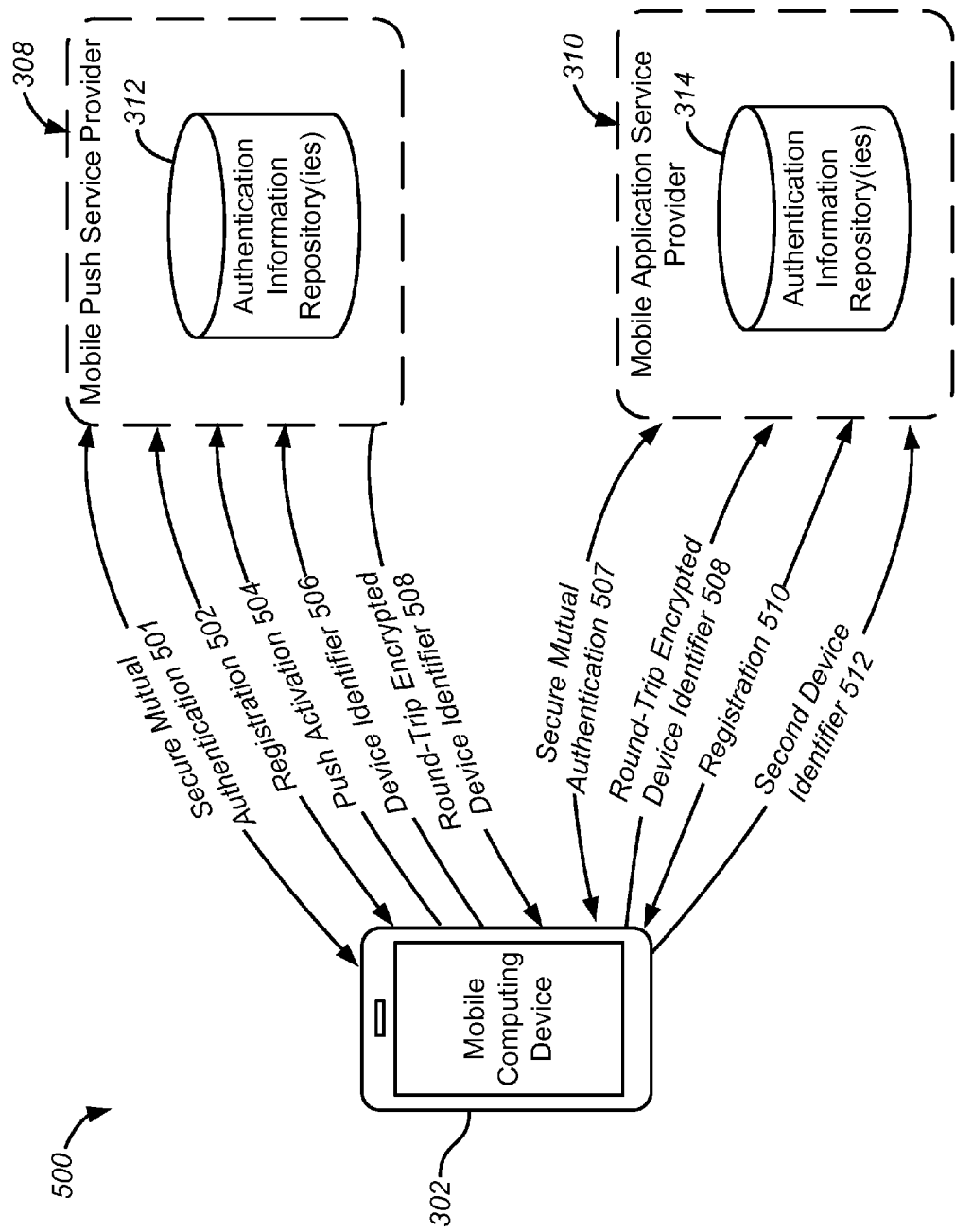
FIG. 5 depicts a simplified functional diagram of a system for push channel authentication, in accordance with certain embodiments of the present disclosure.

FIG. 5 depicts a simplified functional diagram of a system 500 for push channel authentication, in accordance with certain embodiments of the present disclosure. With system 500, a relationship between the app on the mobile computing device 302 and the mobile push service provider 308 may be validated. The mobile computing device 302 and the mobile push service provider 308 may establish a secure connection. In some embodiments, a series of transactions between the mobile computing device 302 and the mobile push service provider 308 may secure a mutual authentication 501. In some embodiments, the mobile computing device 302 may initiate the connection. In alternative embodiments, the mobile push service provider 308 may initiate the connection. In some embodiments, the secure connection may be encrypted. In some embodiments, the secure connection may be a peer-to-peer connection. Intermediary attacks may be reduced because cryptographic information can be transferred securely between controlled endpoints of the mobile computing device 302 and the mobile push service provider 308. In some embodiments, the secure connection may use SSL and/or TSL protocols.

The app on the mobile computing device 302 may register 502 with the mobile push service provider 308. In various embodiments, the registration 502 may be a part of, or consequent to, the process of installing the app on the mobile computing device 302. Part of, or separate from, the registration 502 may be selecting a push activation option 504 to receive push transmissions from the mobile push service provider 308 to the mobile computing device 302. The option 504 to receive push transmissions could be a default selection or could be based on an affirmative user selection. The option 504 could be based on a global user preference saved by the mobile computing device 302 and/or the mobile push service provider 308. In various embodiments, the app could initiate the registration 502 with a call to an operating system of the mobile computing device 302, or the operating system could initiate the registration 502. A request may be transferred to the mobile push service provider 308. In some embodiments, establishing the secure connection may involve passing and authenticating of client-side certificates and/or server-side certificates, such as passing and authenticating of a device certificate and a server certificate. For example, an operating system of the mobile computing device 302 may use a server certificate received from the mobile push service provider 308 and/or a private key for authentication with the mobile push service provider 308.

The operating system of the mobile computing device 302 may pass a device certificate to the mobile push service provider 308. The mobile computing device 302 may have a unique device identifier 506, which may be referenced as a Device ID (DEVID). The DEVID may be passed to the mobile push service provider 308. The mobile push service provider 308 may store any registration/authentication information in a repository. For example, the mobile push service provider 308 may store the DEVID in the authentication information repository 312. The authentication information repository 312 may include one or more of any repository(ies) of data in any suitable form, database(s), database management system(s), server(s), and/or the like to facilitate management/provision/transfer of information for authentication. The mobile push service provider 308 may include the authentication information repository 312 or be separate therefrom in various embodiments.

In various embodiments, the mobile push service provider 308 may use a client-side/device certificate, DEVID, and/or any other suitable information as a device identifier, or otherwise as a basis for a device identifier, for the mobile computing device 302. In some embodiments, the mobile push service provider 308 may encrypt the device identifier to generate a round-trip encrypted device identifier 508. The device identifier may be encrypted with any suitable cryptographic key. In some embodiments, the device identifier may be encrypted symmetrically. In some embodiments, the device identifier may be encrypted asymmetrically. The encryption may be unique with respect to a per-device, per-application, and/or per-user basis. Some embodiments may employ a number of different cryptographic keys. Accordingly, in some embodiments, the encrypted device identifier may be, or otherwise correspond to, a token that uniquely identifies the mobile computing device 302.

The mobile push service provider 308 may send the round-trip encrypted device identifier 508 to the mobile computing device 302. The mobile computing device 302 in turn may provide the round-trip encrypted device identifier 508 to the mobile application service provider 310. The round-trip encrypted device identifier 508 may be transferred in any suitable data format or formats.

The mobile computing device 302 and the mobile application service provider 310 may establish a secure connection. In some embodiments, a series of transactions between the mobile computing device 302 and the mobile application service provider 310 may secure a mutual authentication 507. In some embodiments, the mobile computing device 302 may initiate the connection. In alternative embodiments, the mobile application service provider 310 may initiate the connection. In some embodiments, the secure connection may be encrypted. In some embodiments, the secure connection may be a peer-to-peer connection. In some embodiments, the secure connection may use SSL and/or TSL. In some embodiments, establishing the secure connection may involve passing and authenticating of client-side certificates, such as a device certificate, and/or server-side certificates. For example, the operating system of the mobile computing device 302 may use a server certificate received from the mobile application service provider 310 and/or a private key for authentication.

The round-trip encrypted device identifier 508 may be transferred to the mobile application service provider 310 as a part of, or consequent to, a registration 510 with the mobile application service provider 310. In various embodiments, the registration 510 with the mobile application service provider 310 may be a part of, or consequent to, the process of installing the app on the mobile computing device 302. The mobile application service provider 310 may store the round-trip encrypted device identifier 508.

The mobile application service provider 310 may store any registration/authentication information in a repository. For example, the mobile application service provider 310 may store the encrypted device identifier 508 in an authentication information repository 314. The authentication information repository 314 may include one or more of any repository(ies) of data in any suitable form, database(s), database management system(s), server(s), and/or the like to facilitate management/provision/transfer of information for authentication. The mobile application service provider 310 may include the authentication information repository 314 or be separate therefrom in various embodiments.

Part of, or separate from, the registration 510 may be identifying a unique secondary device identifier 312. In some embodiments, a unique secondary device identifier 312 may identified after a user has logged in to the application. In some embodiments, the secondary unique device identifier may correspond to the MAC address of a wireless card of the mobile computing device 302. However, in other embodiments, the secondary unique device identifier may include any suitable identifier, such as a new identifier generated by the app based on any reliable unique identification information, universally unique identifier, globally unique identifier, etc. The operating system of the mobile computing device 302 may send the secondary device identifier 312 to the mobile application service provider 310.

In some embodiments, the secondary device identifier 312 may be encrypted. The secondary device identifier 312 may be encrypted with any suitable cryptographic key. In some embodiments, the secondary device identifier 312 may be encrypted symmetrically. In some embodiments, the device identifier may be encrypted asymmetrically. The encryption may be unique with respect to a per-device and/or per-application basis. In some embodiments, the encryption may be unique with respect to a per-user basis, for example, based on user identification information received via registration 510. Some embodiments may employ a number of different cryptographic keys. Accordingly, in some embodiments, the encrypted secondary device identifier 312 may be, or otherwise correspond to, a token that uniquely identifies the mobile computing device 302. In some embodiments, the application of the mobile computing device 302 may encrypt the secondary device identifier 312 prior to transfer of the secondary device identifier 312 to the mobile application service provider 310. In some embodiments, the mobile application service provider 310 may encrypt the secondary device identifier 312 after it is received from the mobile computing device 302.

Figure 6:
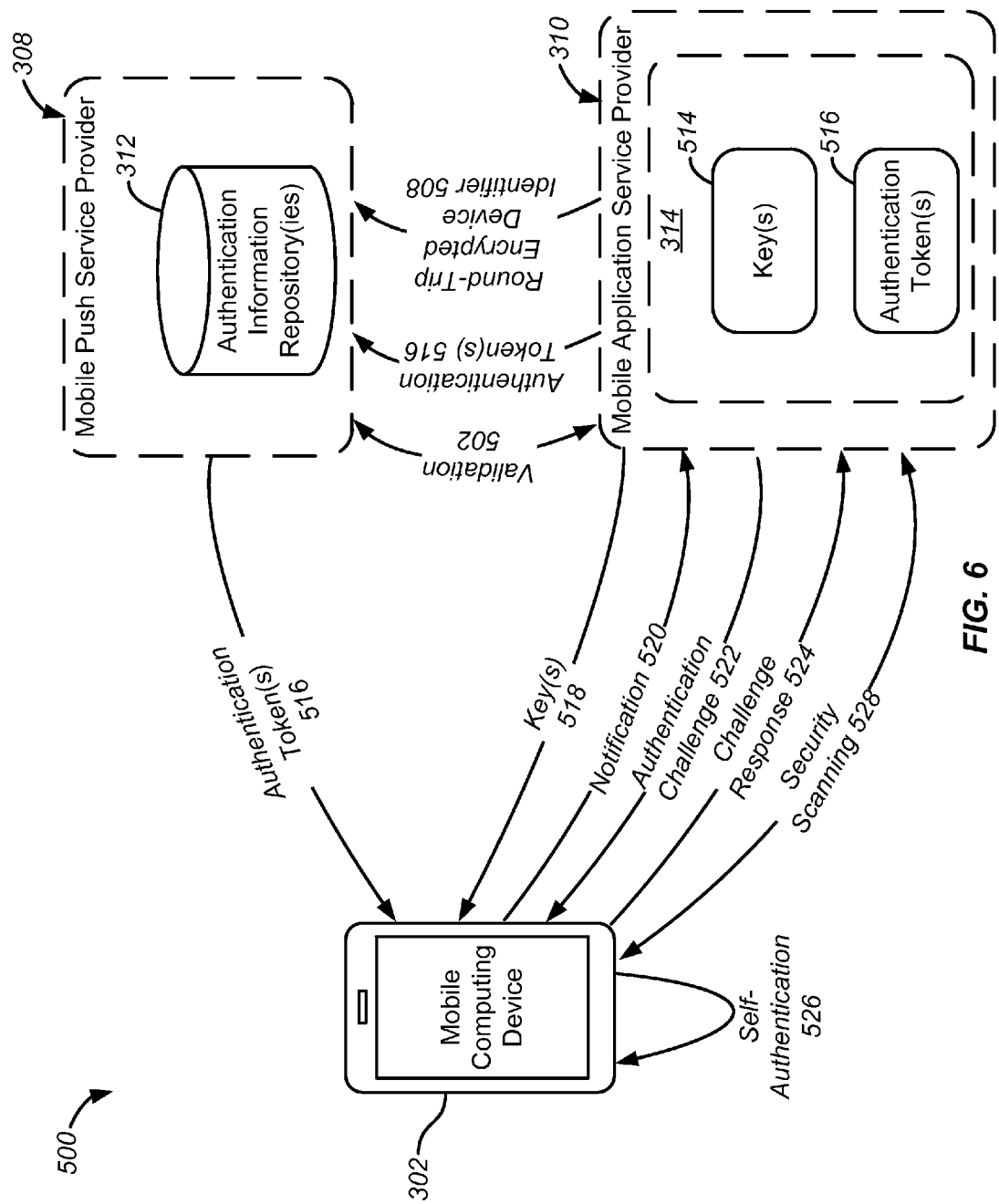
FIG. 6 depicts a simplified functional diagram of a system for push channel authentication, in accordance with certain embodiments of the present disclosure.

FIG. 6 depicts another simplified functional diagram of the system 500 for push channel authentication, in accordance with certain embodiments of the present disclosure. In some embodiments, the mobile application service provider 310 may have a set of keys 514 and/or be configured to generate a set of keys 514 for authentication of the mobile computing device 302. The key 514 may be any suitable cryptographic key. In some embodiments, the set of keys 514 is deterministically derived from a master key when needed.

The mobile application service provider 310 can use one or more of the keys 514 to generate one or more unique authentication tokens 516. In some embodiments, the device identifier may be encrypted symmetrically. In some embodiments, the device identifier may be encrypted asymmetrically.

A relationship between the mobile application service provider 310 and the mobile push service provider 308 may be validated 502. In some embodiments, the mobile application service provider 310 and the mobile push service provider 308 may establish a secure connection. The mobile application service provider 310 may initiate the connection. In some embodiments, the secure connection may be encrypted. In some embodiments, the secure connection may be a peer-to-peer connection. In some embodiments, the secure connection may use SSL and/or TSL.

In some embodiments, establishing the secure connection may involve passing and authenticating of application provider certificates and/or push service provider certificates. For example, the mobile application service provider 310 may send a provider certificate to the mobile push service provider 308, the provider certificate having been previously received from the mobile push service provider 308. The mobile push service provider 308 can then authenticate the provider certificate, for example, with a private key. In some embodiments, the mobile application service provider 310 may identify a specific application as part of the process of establishing the connection. For example, an application identifier may be passed along with, or included in, the provider certificate, in some embodiments.

The mobile application service provider 310 may provide the authentication token 516 to the mobile push service provider 308 for a push transmission to the mobile computing device 302. In some embodiments, the mobile application service provider 310 may also provide the encrypted device identifier 308 to the mobile push service provider 308. In some embodiments, mobile application service provider 310 may construct a JSON-formatted object to send to the mobile push service provider 308. The JSON object may include the authentication token 516. The JSON object may further include encrypted device identifier 308.

In some embodiments, the encrypted device identifier 308 may indicate to the mobile push service provider 308 the target mobile computing device 302. The mobile push service provider 308 may validate that the encrypted device identifier 308 is associated with the particular mobile computing device 302. For example, the mobile push service provider 308 may decrypt the device identifier based on a stored key and information stored in the authentication information repository 312.

After validation, the mobile push service provider 308 may send the authentication token 516 as a push transmission to the target mobile computing device 302. The mobile application service provider 310 may send one or more unique keys 518 to the target mobile computing device 302 for decryption of the authentication token 516. Thus, the key 518 may be sent separately from the push channel used for the authentication token 516. The key 518 may be sent out-of-band with respect to the push channel. In some embodiments, the key 518 may be sent as a push transmission. Thus, dual push channels may be employed for authentication. In other embodiments, the key 518 may be sent in response to a request of the mobile computing device 302.

In some embodiments, the key 518 sent to the mobile computing device 302 may be symmetrical with respect to the key 514 used to generate the authentication token 516. Various embodiments may employ any suitable type of symmetrical keys and symmetrical key algorithm. In other embodiments, the key 518 sent to the mobile computing device 302 may be asymmetrical to the key 514 used to generate. Various embodiments may employ any suitable type of asymmetrical keys and asymmetrical key algorithm. The key 518 may be a public key associated with a private key 514.

Having obtained the authentication token 516 and the key 518, the application may authenticate the mobile computing device 302 with the mobile application service provider 310. This may ensure that a bot is not attempting to access the system. In some embodiments, the application may decrypt the authentication token 516 with the key 518. In some embodiments, the result of the decryption of the authentication token 516 may be sent to the mobile application service provider 310. In some embodiments, the mobile application service provider 310 may not service the application if the expected result of the decryption is not received.

In some embodiments, the application may notify 520 the mobile application service provider 310 when the authentication token 516 and the key 518 have been received. In some embodiments, the mobile application service provider 310 may send an authentication challenge 522 to the mobile computing device 302. In some embodiments, the authentication challenge 522 could be sent responsive to a notification from the application that the authentication token 516 and the key 518 have been received at the mobile computing device 302. In some embodiments, the authentication challenge 522 could be sent automatically, without such a notification. In some embodiments, the authentication challenge 522 may be sent via the push channel from the mobile push service provider 308 in the manner that the authentication token 516 was sent. In other embodiments, as depicted, the authentication challenge 522 may be sent separately from that push channel. The authentication challenge 522 may be sent via the second channel in the manner that the authentication key 518 was sent. In some embodiments, the application may be configured with an authentication challenge prerequisite to continued operation, such that a prompt to satisfy the authentication challenge is self-initiated. The application may be configured to not proceed without satisfying the authentication challenge.

The authentication challenge 522 could only be met if the mobile computing device 302 possesses both the authentication token 516 and the authentication key 518. In some embodiments, the application may be configured to auto-disable if a successful response is not provided for the authentication challenge. In some embodiments, the mobile application service provider 310 may not service the application if a successful response is not provided for the authentication challenge. Some embodiments may impose time constraints on the authentication process. For example, the application may require that authentication be effected within a time period, such as ten minutes, after an authentication request has been initiated.

In some embodiments, the mobile computing device 302 may send a response 524 to the authentication challenge to the mobile application service provider 310. In some embodiments, the authentication challenge may be signed using the authentication token 516 and the key 518 for the response 524. In some embodiments, the application of the mobile computing device 302 may decrypt the authentication token 516 with the key 518, or another key derived from the key 518, and response 524 may be based on that decryption. In some embodiments, may include the decrypted token. In some embodiments, the application may again encrypt the token with a suitable cryptographic method, the mobile application service provider 310 having the corresponding key for decryption, and the response 524 may include the newly encrypted token. In some embodiments, the application may send another suitable response based at least in part on the authentication token 516 and the key 518. In some embodiments, for example, where the authentication is self-initiated by the application, the challenge response 524 may include a confirmation of a successful verification of the authentication challenge to the mobile application service provider 310.

The mobile application service provider 310 may verify that the mobile application has received the authentication token 516 and the key 518. The mobile application service provider 310 may process the response 524. In embodiments where the response 524 includes an encrypted value for the validation, the mobile application service provider 310 may identify a cryptographic key pair/value/algorithm to decrypt the encrypted value. In some embodiments, an identifier of the cryptographic key pair/value/algorithm may be included in, or derived from, the response 524. In other embodiments, the cryptographic key pair/value/algorithm may have been predetermined and pre-identified by the mobile application service provider 310. In some embodiments, the information sent from the mobile application, whether it be the authentication token, the decrypted token, another token, or other information for verification, may be validated against stored authentication information in the authentication information repository 314.

Additionally, in some embodiments, the application and/or other components of the mobile computing device 302 may perform any of various methods of self-authentication 526 to ensure security integrity. For example, any suitable method of jailbreak detection may be implemented to ensure integrity of the mobile computing device 302. When the application is loaded, its integrity could be confirmed to ensure that it conforms to the expected application and that its behavior not changed. In the event that a jailbreak is detected, certain operations of the application may be blocked, the application may automatically close or otherwise cease functioning, and/or certain services of the mobile application service provider 310 may not be provided after the mobile application service provider 310 has been notified of the integrity breach or otherwise becomes aware of the integrity breach, for example, as part of a security scanning process 528.

In some embodiments, the application and/or the mobile application service provider 310 as part of the security scanning 528 may be configured to sniff for jailbreak indicia to ensure that the privilege restrictions remain intact. For example, the mobile computing device 302 may include a sandbox for third-party applications, and the sandbox contents and/or privilege configuration(s) may be checked for integrity. The space outside the sandbox may also be checked for integrity. Operational tracks could be checked for the use of restricted operations. Files inside and/or outside the sandbox could be analyzed. A hash and/or a checksum may be checked for correspondence to any stored information.

Additionally, in some embodiments, the security scanning 528 may implement port sniffing to detect if other devices, such as a remote desktop computing device, are being used to log into a jailbroken mobile computing device 302. The port sniffing may identify ports being used for remote login. Upon identification of such a situation, traffic for that device may be blocked.

Accordingly, certain embodiments may provide a multiple channel authentication regime to lock down communications between the application of the mobile computing device 302 and the mobile application service provider 310. Various methods of uniquely identifying the mobile computing device 302 may be employed, with certain embodiments conjoining multiple methods to synergistically enhance the level of authentication. Multiple unique device identifiers may be identified for a given mobile computing device 302. One or more of the multiple unique device identifiers may be a basis for registering the mobile computing device 302 with the mobile application service provider 310 system. One or more of the multiple unique device identifiers may be a basis for key and/or authentication token generation. Certain embodiments provide for secure key delivery. The key and the authentication token may be sent securely to the application via multiple channels. The authentication may be peer-to-peer in some embodiments, eliminating the threat of a bottleneck or a single point of failure. A user of the mobile computing device 302 can only interface with the mobile application service provider 310 system using that key and authentication token. An application not having the key and authentication token cannot communicate with the mobile application service provider 310.

Figure 7:
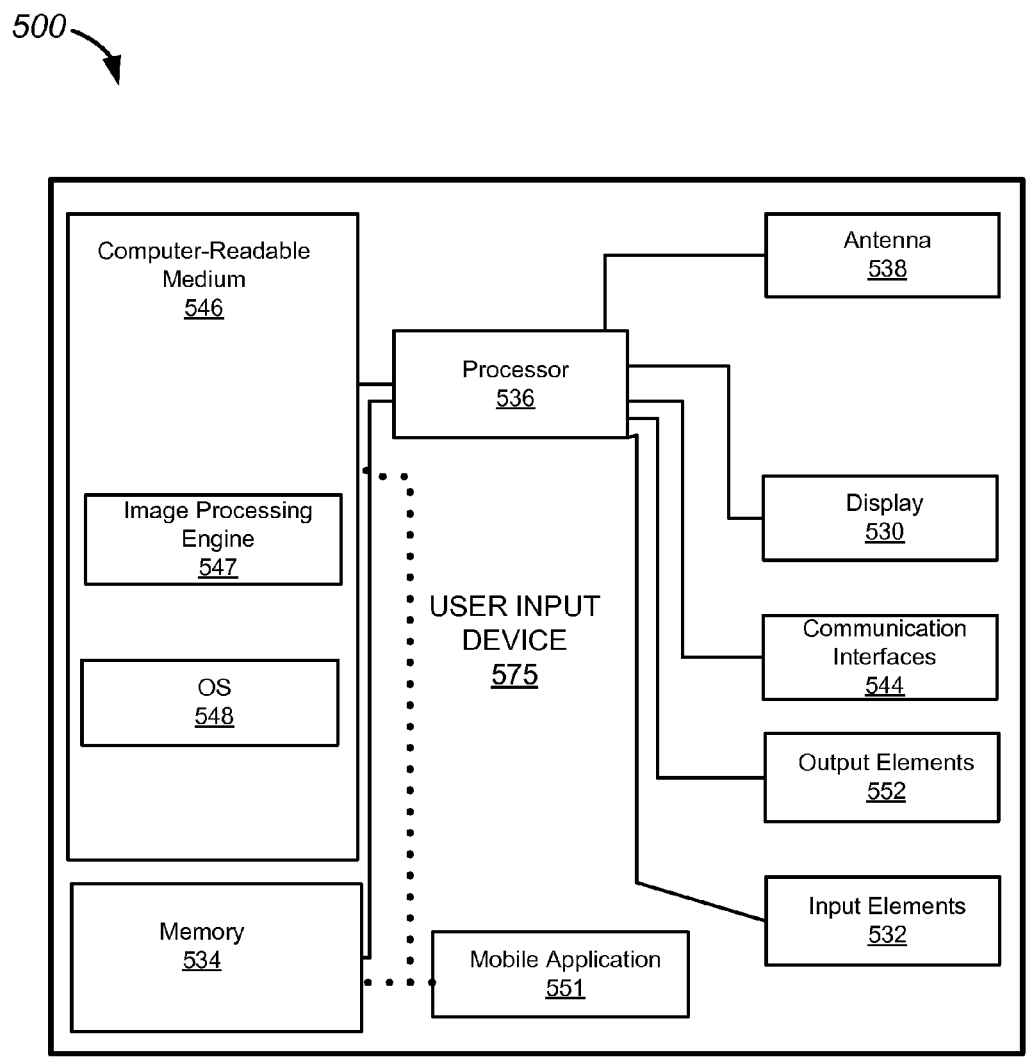
FIG. 7 is a functional block diagram of a mobile computing device with a mobile application configured to run on the mobile computing device, in accordance with certain embodiments of the present disclosure.

FIG. 7 is a functional block diagram of a mobile computing device 700 with a mobile application 751 configured to run on the mobile computing device 700, according to certain embodiments of the present disclosure. The mobile computing device 700 may correspond to the mobile computing device 302 in certain embodiments; however, the mobile computing devices illustrated herein should not be seen as limiting. Mobile computing devices in accordance with the present disclosure may have fewer, more, and/or different components/features. The mobile computing device 700 may include a display 730 and input elements 732 to allow a user to input information into the mobile computing device 700. By way of example without limitation, the input elements 732 may include one or more of a keypad, a trackball, a touchscreen, a touchpad, a pointing device, a microphone, a voice recognition device, and/or any other appropriate mechanism for the user to provide input.

The mobile computing device 700 may include a memory 734 communicatively coupled to a processor 736 (e.g., a microprocessor) for processing the functions of the device. The mobile computing device 700 may include at least one antenna 738 for wireless data transfer. In addition, the mobile computing device 700 may include one or more interfaces in addition to the antenna 738, e.g., a wireless interface coupled to an antenna. The communications interfaces 744 can provide a near field communication interface (e.g., contactless interface, Bluetooth, optical interface, etc.) and/or wireless communications interfaces capable of communicating through a network such as a cellular network or through Wi-Fi, such as with a wireless local area network (WLAN). Accordingly, the mobile computing device 700 may be capable of transmitting and receiving information wirelessly through both short range, radio frequency (RF) and cellular and Wi-Fi connections. The interfaces 744 may include one or more local communication interfaces. In some embodiments, a network interface 744 may be configured to communicate via one or more networks, such as the Internet, to communicate with an application service provider and/or a push service provider. Information may be transmitted and/or received via interface 744.

The mobile computing device 700 can also include at least one computer-readable medium 746 coupled to the processor 736, which stores application programs and other computer code instructions for operating the device, such as an operating system (OS) 748. The mobile application 751 may be stored in the memory 734 and/or computer-readable media 746. The mobile application 751 may be any set of instructions, application level or otherwise, that facilitate certain embodiments of the present disclosure. In some embodiments, the mobile application 751 may correspond to an application that may have been pre-installed on the platform of the mobile computing device 700. In some embodiments, the application can include a customizable user interface (UI), which can be determined by the user's preferences through application-level programming.

Figure 8:
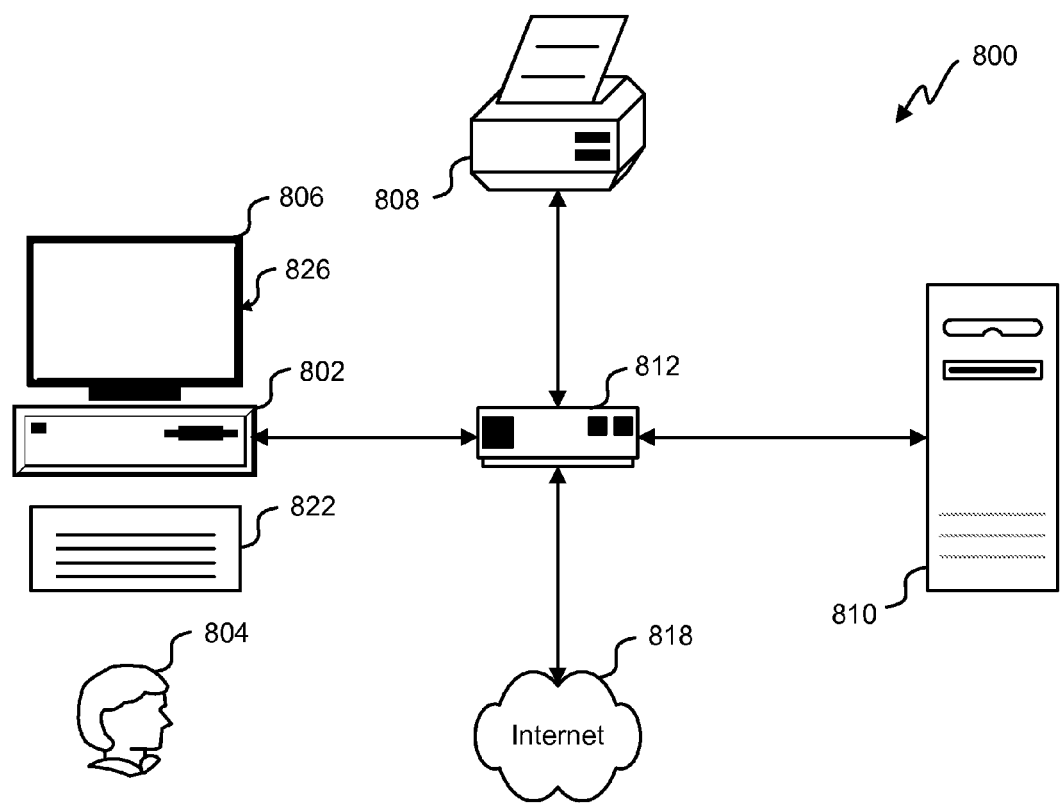
FIG. 8 depicts a block diagram of an embodiment of a computer system, in accordance with certain embodiments of the present disclosure.

Referring next to FIG. 8, an exemplary environment with which embodiments may be implemented is shown with a computer system 800 that can be used by a designer 804 to design, for example, electronic designs. The computer system 800 can include a computer 802, keyboard 822, a network router 812, a printer 808, and a monitor 806. The monitor 806, processor 802 and keyboard 822 are part of a computer system 826, which can be a laptop computer, desktop computer, handheld computer, mainframe computer, etc. The monitor 806 can be a CRT, flat screen, etc.

A designer 804 can input commands into the computer 802 using various input devices, such as a mouse, keyboard 822, track ball, touch screen, etc. If the computer system 800 comprises a mainframe, a designer 804 can access the computer 802 using, for example, a terminal or terminal interface. Additionally, the computer system 826 may be connected to a printer 808 and a server 810 using a network router 812, which may connect to the Internet 818 or a WAN.

The server 810 may, for example, be used to store additional software programs and data. In one embodiment, software implementing the systems and methods described herein can be stored on a storage medium in the server 810. Thus, the software can be run from the storage medium in the server 810. In another embodiment, software implementing the systems and methods described herein can be stored on a storage medium in the computer 802. Thus, the software can be run from the storage medium in the computer system 826. Therefore, in this embodiment, the software can be used whether or not computer 802 is connected to network router 812. Printer 808 may be connected directly to computer 802, in which case, the computer system 826 can print whether or not it is connected to network router 812.

Figure 9:
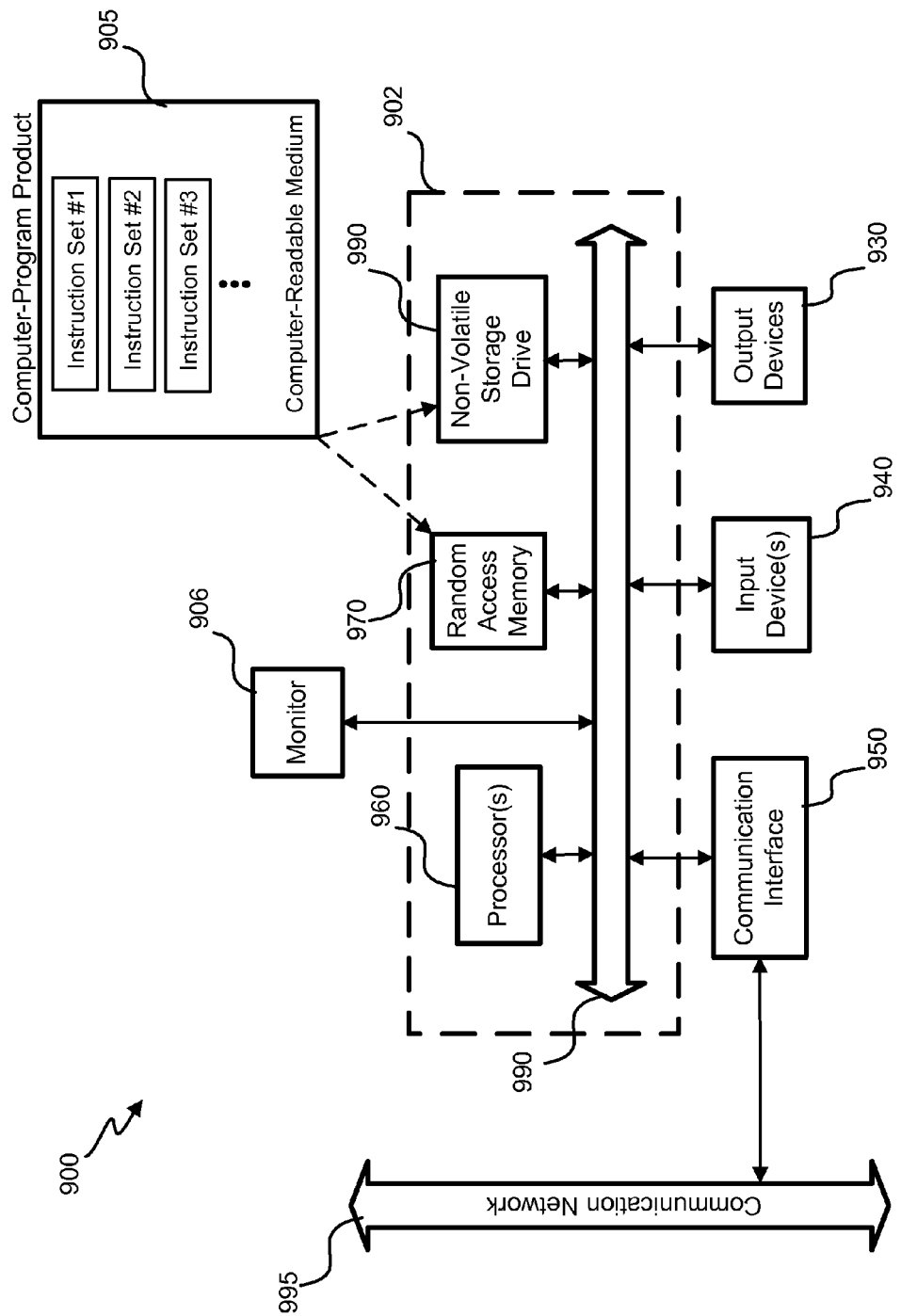
FIG. 9 depicts a block diagram of an embodiment of a special-purpose computer system, in accordance with certain embodiments of the present disclosure.

With reference to FIG. 9, an embodiment of a special-purpose computer system 104 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 826, it is transformed into the special-purpose computer system 104.

Special-purpose computer system 104 comprises a computer 802, a monitor 806 coupled to computer 802, one or more additional user output devices 930 (optional) coupled to computer 802, one or more user input devices 940 (e.g., keyboard, mouse, track ball, touch screen) coupled to computer 802, an optional communications interface 950 coupled to computer 802, a computer-program product 905 stored in a tangible computer-readable memory in computer 802. Computer-program product 905 directs system 104 to perform the above-described methods. Computer 802 may include one or more processors 960 that communicate with a number of peripheral devices via a bus subsystem 990. These peripheral devices may include user output device(s) 930, user input device(s) 940, communications interface 950, and a storage subsystem, such as random access memory (RAM) 970 and non-volatile storage drive 980 (e.g., disk drive, optical drive, solid state drive), which are forms of tangible computer-readable memory.

Computer-program product 905 may be stored in non-volatile storage drive 980 or another computer-readable medium accessible to computer 802 and loaded into memory 970. Each processor 960 may comprise a microprocessor, such as a microprocessor from Intel® or Advanced Micro Devices, Inc.®, or the like. To support computer-program product 905, the computer 802 runs an operating system that handles the communications of product 905 with the above-noted components, as well as the communications between the above-noted components in support of the computer-program product 905. Exemplary operating systems include Windows® or the like from Microsoft® Corporation, Solaris® from Oracle®, LINUX, UNIX, and the like.

User input devices 940 include all possible types of devices and mechanisms to input information to computer system 802. These may include a keyboard, a keypad, a mouse, a scanner, a digital drawing pad, a touch screen incorporated into the display, audio input devices such as voice recognition systems, microphones, and other types of input devices. In various embodiments, user input devices 940 are typically embodied as a computer mouse, a trackball, a track pad, a joystick, wireless remote, a drawing tablet, a voice command system. User input devices 940 typically allow a user to select objects, icons, text and the like that appear on the monitor 806 via a command such as a click of a button or the like. User output devices 930 include all possible types of devices and mechanisms to output information from computer 802. These may include a display (e.g., monitor 806), printers, non-visual displays such as audio output devices, etc.

Communications interface 950 provides an interface to other communication networks and devices and may serve as an interface to receive data from and transmit data to other systems, WANs and/or the Internet 818. Embodiments of communications interface 950 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 950 may be coupled to a computer network, to a FireWire® bus, or the like. In other embodiments, communications interface 950 may be physically integrated on the motherboard of computer 802, and/or may be a software program, or the like.

RAM 970 and non-volatile storage drive 980 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 970 and non-volatile storage drive 980 may be configured to store the basic programming and data constructs that provide the functionality of various embodiments of the present invention, as described above.

Software instruction sets that provide the functionality of the present invention may be stored in RAM 970 and non-volatile storage drive 980. These instruction sets or code may be executed by the processor(s) 960. RAM 970 and non-volatile storage drive 980 may also provide a repository to store data and data structures used in accordance with the present invention. RAM 970 and non-volatile storage drive 980 may include a number of memories including a main random access memory (RAM) to store of instructions and data during program execution and a read-only memory (ROM) in which fixed instructions are stored. RAM 970 and non-volatile storage drive 980 may include a file storage subsystem providing persistent (non-volatile) storage of program and/or data files. RAM 970 and non-volatile storage drive 980 may also include removable storage systems, such as removable flash memory.

Bus subsystem 990 provides a mechanism to allow the various components and subsystems of computer 802 communicate with each other as intended. Although bus subsystem 990 is shown schematically as a single bus, alternative embodiments of the bus subsystem may utilize multiple busses or communication paths within the computer 802.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for push channel authentication for mobile computing devices, the method comprising:
 supplying a mobile application configured to run on a mobile computing device;
 processing an indication that the mobile application has been loaded on the mobile computing device;
 processing a device identifier for the mobile computing device, the device identifier received from the mobile computing device through a network;
 storing information corresponding to the device identifier in an authentication information repository;
 generating an authentication key and an authentication token;
 causing the authentication token to be sent to the mobile computing device through a push channel, wherein the push channel is encrypted with a push key;
 causing the authentication key to be sent from a mobile application service provider to the mobile computing device through a second channel; and
 verifying that the mobile application has received the authentication key and the authentication token, the verifying comprising:
  processing a notification from the mobile computing device that the mobile application has received the authentication key and the authentication token; and
  validating the notification at least in part with the information corresponding to the device identifier in the authentication information repository.

2. The method of claim 1, wherein the authentication token is at least partially based on the device identifier.

3. The method of claim 1, further comprising:
 processing a second device identifier for the mobile computing device, the second device identifier received from the mobile computing device through the network, wherein the authentication token is at least partially based on one or both of the device identifier and the second device identifier.

4. The method of claim 1, wherein the authentication key is at least partially based on the device identifier.

5. The method of claim 1, wherein the authentication key is a public key that is associated with a private authentication key.

6. The method of claim 1, further comprising:
 initiating a secure connection to the mobile computing device, wherein the secure connection corresponds to the second channel and is one or more of a second push channel and/or a peer-to-peer connection.

7. The method of claim 1, wherein the processing the notification comprises extracting the device identifier from the notification.

8. One or more non-transitory computer-readable storage media having computer-readable instructions for push channel authentication for mobile computing devices, the instructions to cause one or more processors to perform a method, the method comprising:
 processing an indication that a mobile application configured to run on a mobile computing device has been loaded on the mobile computing device;
 processing a device identifier for the mobile computing device, the device identifier received from the mobile computing device through a network;
 storing information corresponding to the device identifier in an authentication information repository;
 generating an authentication key and an authentication token;
 causing the authentication token to be sent to the mobile computing device through a push channel, wherein the push channel is encrypted with a push key;
 causing the authentication key to be sent from a mobile application service provider to the mobile computing device through a second channel; and
 verifying that the mobile application has received the authentication key and the authentication token, the verifying comprising:
  processing a notification from the mobile computing device that the mobile application has received the authentication key and the authentication token; and
  validating the notification at least in part with the information corresponding to the device identifier in the authentication information repository.

9. The one or more non-transitory computer-readable storage media of claim 8, wherein the authentication key is at least partially based on the device identifier.

10. The one or more non-transitory computer-readable storage media of claim 8, wherein the authentication key is a public key that is associated with a private authentication key.

11. The one or more non-transitory computer-readable storage media of claim 8, wherein the method further comprises:
 initiating a secure connection to the mobile computing device, wherein the secure connection corresponds to the second channel and is one or more of a second push channel and/or a peer-to-peer connection.

12. The one or more non-transitory computer-readable storage media of claim 8, wherein the processing the notification comprises extracting the device identifier from the notification.

13. The one or more non-transitory computer-readable storage media of claim 8, wherein the authentication token is at least partially based on the device identifier.

14. The one or more non-transitory computer-readable storage media of claim 13, wherein the method further comprises processing a second device identifier for the mobile computing device, the second device identifier received from the mobile computing device through the network, wherein the authentication token is at least partially based on one or both of the device identifier and the second device identifier.

15. A system for push channel authentication for mobile computing devices, the system comprising:
one or more network interfaces configured to provide access to the Internet;
an authentication information repository;
one or more processors, coupled to the one or more network interfaces and to the authentication information repository, the one or more processors to execute instructions to:
process an indication that a mobile application configured to run on a mobile computing device has been loaded on the mobile computing device;
process a device identifier for the mobile computing device, the device identifier received from the mobile computing device through a network;
store information corresponding to the device identifier in the authentication information repository;
generate an authentication key and an authentication token;
cause the authentication token to be sent to the mobile computing device through a push channel, wherein the push channel is encrypted with a push key;
cause the authentication key to be sent from a mobile application service provider to the mobile computing device through a second channel; and
verify that the mobile application has received the authentication key and the authentication token, the verifying comprising:
processing a notification from the mobile computing device that the mobile application has received the authentication key and the authentication token; and
validating the notification at least in part with the information corresponding to the device identifier in the authentication information repository; and
one or more storage media coupled to the one or more processors to retain the instructions.

16. The system of claim 15, wherein the authentication token is at least partially based on the device identifier.

17. The system of claim 15, the one or more processors to further execute instructions to:
process a second device identifier for the mobile computing device, the second device identifier received from the mobile computing device through the network, wherein the authentication token is at least partially based on one or both of the device identifier and the second device identifier.

18. The mobile application system of claim 15, wherein the authentication key is at least partially based on the device identifier.

19. The mobile application system of claim 15, wherein the authentication key is a public key that is associated with a private authentication key.

20. The mobile application system of claim 15, wherein the processing the notification comprises extracting the device identifier from the notification.

\* \* \* \* \*